Mar. 13, 1923.

C. G. CLEMENT

SEMITRAILER

Filed Oct. 22, 1919

1,448,054

Inventor;
Charles G. Clement,

Witness;

by Burton & Burton
his Attys.

Patented Mar. 13, 1923.

1,448,054

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

SEMITRAILER.

Application filed October 22, 1919. Serial No. 332,362.

*To all whom it may concern:*

Be it known that I, CHARLES G. CLEMENT, a citizen of the United States, and a resident of Edgerton, in the county of Rock and State of Wisconsin, have invented certain new and useful Improvements in Semitrailers, of which the following is a specification, reference being had to the accompanying drawings, forming a part thereof.

The purpose of this invention is to provide a semi-trailer with means by which its forward end may be supported and also raised or lowered at will to facilitate engagement or disengagement of the fifth wheel by which the trailer is connected to its tractor vehicle. It consists of the features and elements of construction and their combinations hereinafter described and shown in the drawings as indicated by the claims.

Figure 1:
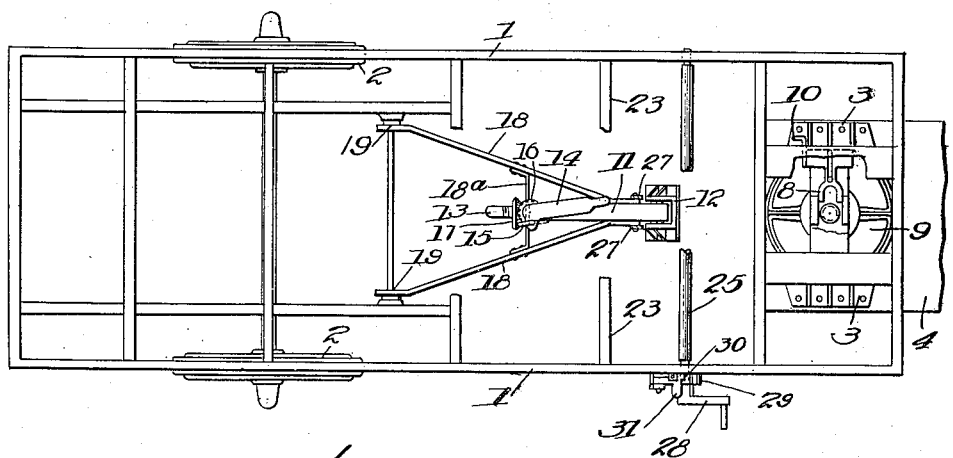
Figure 1 is a top plan view of a semi-trailer frame with the parts broken away to show more clearly certain features of the invention.

For the purpose of illustrating this invention the semi-trailer is shown in the drawings with the body omitted and consisting simply of a frame, 1, with a pair of wheels, 2. The trailer is connected by means of a fifth wheel which may be understood as of a construction similar to that shown in Patent No. 1, 261,261, dated April 2nd, 1919. The lower member, 3, of such fifth wheel is shown mounted on the rear deck of a tractor vehicle, 4, whose tractor wheels are indicated at 5. This member is provided with a king post, 6, formed with a groove, 7, adapted for engagement by a U-shaped locking member, 8, slidably carried on the upper member, 9, of the fifth wheel, and arranged to be drawn out of engaging position by means of a handle, 10, shown in Figure 1. It will be understood, however, that when the locking member, 8, has been withdrawn from its engagement with the groove, 7, of the king post, 6, the weight of the trailer frame, 1, together with any load which it may be carrying will hold the parts together, and considerable power will be required to lift the front end of the trailer sufficiently for disengagement of the upper member, 9, of the fifth wheel from the king post, 6. Obviously the first portion of the lifting movement will merely relieve the springs of the tractor vehicle, 4, of such portion of the load as they have been carrying, and permit the rear deck, 4, of said vehicle to rise some little distance until said springs assume their normal unloaded position before there will be any separation of the two members of the fifth wheel. After this the further lifting of the front end of the trailer will separate the part, 9, from the part, 3, until it is clear of the post, 6, and the tractor vehicle can then be driven away.

Figure 2:
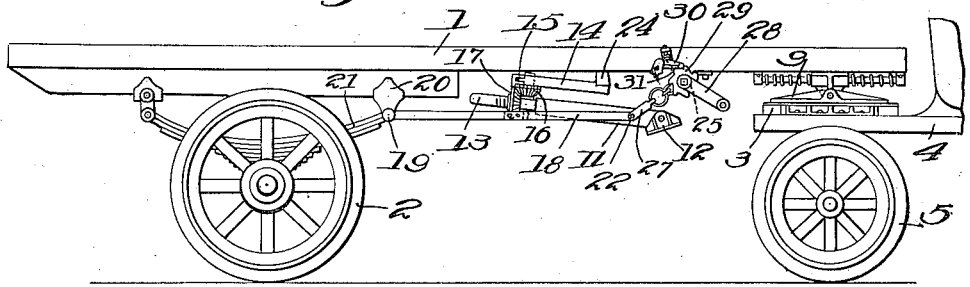
Figure 2 is a side elevation showing the semi-trailer connected to a tractor vehicle and the raising and lowering device swung up clear of the road.
Figure 3:
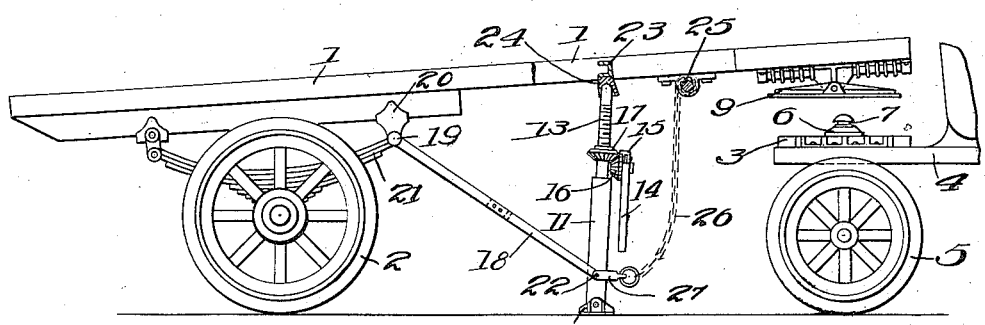
Figure 3 is a side elevation taken similarly to Figure 2 but showing the jack which is used for raising the semi-trailer frame in operation, and showing the front end of the frame elevated and disengaged from the tractor vehicle.

For accomplishing this there is provided a jack whose standard, 11, is fitted with a pivoted foot piece, 12, and provided with a jack screw, 13, and operating handle, 14, carrying the pivoted dog, 15, arranged to engage teeth of a bevel gear, 16, which meshes with the bevel gear, 17, which in turn is the nut of the jack, being threaded to engage threads of the jack screw, 13. This device is permanently associated with the trailer frame by a pair of radius arms, 18, which may be conveniently pivoted to the frame as at 19, at the forward spring shackles, 20, for the load-carrying springs, 21, as indicated in Figures 2 and 3. From these pivotal connections the arms, 18, converge to pivots, 22, near the base of the standard, 11. Above the pivots, 22, a cross member, 23, of the frame, 1, is provided with a downwardly-open fitting or socket, 24, to receive the upper end of the jack screw, 13.

To facilitate locating the end, 13, in proper registration with the fitting and for other reasons hereinafter stated, the socket, 24, formed therein is provided with a depending flange of greater depth at the side and front than at the rear. This permits of the jack being swung about its pivot, 22, and having been previously elongated to just overreach the flange at its greater depth, it will readily enter the socket at the shallow side and be stopped from further movement by the said deeper flange.

When the jack is to be put out of service after the trailer has been re-attached to the tractor vehicle, the end of the jack screw, 13, is lowered out of engagement with the shallow side of the socket, 24, and the jack is bodily swung about the pivot, 22, until it rests upon a cross member, 18$^a$, which connects the two radius arms, 18, as shown in Fig. 1. It will be seen that the jack can swing only in that direction because of the variant depth of the flange. The arms, 18, are then swung upwardly about their pivots, 19, by means of a roller, 25, operating as a windlass to wind up a chain, 26, which is conveniently connected at its lower end to the jack standard, 11, by means of a clevice, 27, also attached to the pivots, 22. The handle, 14, is of such length that when the parts are in folded position as shown in Figure 2, the extreme end thereof will just reach within the socket, 24, and will be held thereby against lateral displacement. The shaft or roller, 25, is provided with a crank handle, 28, and ratchet wheel, 29, together with a locking dog, 30 acting upon the ratchet 29, to hold the parts at the upper limit illustrated in Figure 2 so as to keep the jack clear of the road. Preferably the dog or the detent, 30, is spring-retained in locking position so that it will not be jarred out of engagement with the ratchet wheel in travel over rough roads, but it is provided with a finger piece, 31, by which it may be thrown out of service to permit quick replacement of the jack in position for supporting the trailer frame, 1.

I claim:

1. In combination with a tractor vehicle and a semi-trailer connected thereto, means for supporting the forward end of the trailer independently of the tractor, comprising a strut adapted to be interposed between a member of the trailer frame and the ground and a radius arm pivoted at one end to said strut and at the other end to the frame for permanently securing the strut thereto, and a downwardly-open fitting on the frame member formed to receive the upper end of the strut for removably securing it to the said frame member.

2. In combination with a tractor vehicle and a semi-trailer connected thereto, means for supporting the forward end of the trailer independently of the tractor, comprising a strut adapted to be interposed between a member of the trailer frame and the ground and a radius arm pivoted at one end to said strut and at the other end to the frame for permanently securing the strut thereto, and a downwardly-open fitting on the frame member formed to receive the upper end of the strut, such fitting having a depending flange of variant depth, the shallow side thereof permitting the said upper end of the strut to swing into and out of such fitting, and a deeper side adapted to arrest the swing of the strut for properly registering said strut end with the said fitting.

3. In the combination defined in claim 1, means for holding the parts clear of the road said means comprising a windlass on the trailer frame and a flexible member on the windlass with one end attached to one of said pivotally connected parts, and locking means to hold the windlass against turning.

4. In combination with a tractor vehicle and a semi-trailer connected thereto, a jack adapted to support the forward end of said trailer independently of the tractor and disposed under the middle of the width of the trailer frame; a handle to operate such jack and a fitting on a cross member of the trailer frame, such handle arranged to be held in said fitting when the jack is in inoperative position.

In testimony whereof, I have hereunto set my hand at Edgerton, Wis., this 14th day of October, 1919.

CHARLES G. CLÉMENT.